United States Patent
Schindler et al.

(10) Patent No.: US 12,111,417 B2
(45) Date of Patent: Oct. 8, 2024

(54) OFDM RADAR SENSOR INCLUDING MULTIPLE TRANSMISSION CHANNELS AND PROGRESSIVE COMPUTATION OF TIME SIGNALS

(71) Applicant: Robert Bosch GmbH, Stuttgart (DE)

(72) Inventors: Daniel Schindler, Korntal-Münchingen (DE); Robert Nabholz, Karlsruhe (DE); Juergen Hasch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 360 days.

(21) Appl. No.: 17/623,743

(22) PCT Filed: Jun. 4, 2020

(86) PCT No.: PCT/EP2020/065470
§ 371 (c)(1),
(2) Date: Dec. 29, 2021

(87) PCT Pub. No.: WO2021/004702
PCT Pub. Date: Jan. 14, 2021

(65) Prior Publication Data
US 2022/0244348 A1 Aug. 4, 2022

(30) Foreign Application Priority Data
Jul. 6, 2019 (DE) .................... 10 2019 209 968.8

(51) Int. Cl.
*G01S 7/35* (2006.01)
*H04L 27/26* (2006.01)
*G01S 13/58* (2006.01)

(52) U.S. Cl.
CPC .......... *G01S 7/354* (2013.01); *H04L 27/2647* (2013.01); *G01S 7/356* (2021.05); *G01S 13/584* (2013.01)

(58) Field of Classification Search
CPC ........ G01S 7/354; G01S 7/356; G01S 13/584; H04L 27/2647
See application file for complete search history.

(56) References Cited

U.S. PATENT DOCUMENTS 5,787,123 A * 7/1998 Okada ............... H04L 27/26524
375/324
2007/0253319 A1 * 11/2007 Jansen ................ H04L 27/2655
370/208

(Continued)

FOREIGN PATENT DOCUMENTS

DE 102007044488 A1 * 5/2008 ........... H04L 1/0045
DE 102015202874 A1 8/2016

(Continued)

OTHER PUBLICATIONS

Bahai et al. "Multi-Carrier Digital Communications Theory and Applications of OFDM," 2004 Springer Science + Business Media, Inc. (Year: 2004).*

(Continued)

*Primary Examiner* — Bernarr E Gregory
*Assistant Examiner* — Samarina Makhdoom
(74) *Attorney, Agent, or Firm* — NORTON ROSE FULBRIGHT US LLP; Gerard A. Messina (57) ABSTRACT

An OFDM radar sensor including multiple transmission channels and at least one reception channel, and a method for operating such an OFDM radar sensor. At least for first transmission channels, the signal form of the signal to be transmitted, which includes a sequence of OFDM symbols in question, is progressively computed in portions for each transmission channel, and multiple buffer memories are used in alternation for storing a computed portion of the signal form and for reading out a previously computed and stored preceding portion of the signal form, which is converted from digital to analog and transmitted. A particular portion (Continued)

of the signal form is computed and stored in one of the buffer memories while a preceding portion of the signal form is being read out from another of the buffer memories and converted from digital to analog, and transmitted on the transmission channel in question.

11 Claims, 5 Drawing Sheets

(56) References Cited

U.S. PATENT DOCUMENTS

| | | | | |
|---|---|---|---|---|
| 2008/0240410 | A1* | 10/2008 | Dapper | H04N 21/2383 |
| | | | | 379/362 |
| 2016/0219506 | A1* | 7/2016 | Pratt | H04W 40/16 |
| 2016/0254889 | A1* | 9/2016 | Shattil | H04L 5/0035 |
| | | | | 370/329 |
| 2016/0356885 | A1* | 12/2016 | Hakobyan | G01S 7/352 |
| 2018/0203095 | A1 | 7/2018 | Xie et al. | |

FOREIGN PATENT DOCUMENTS

| | | |
|---|---|---|
| DE | 102015210454 A1 | 12/2016 |
| WO | 2018222268 A1 | 12/2018 |

OTHER PUBLICATIONS

International Search Report for PCT/EP2020/065470 Issued Sep. 15, 2020.

Wiesbeck Werner et al. "Radar 2020: The future of radar systems" 2015 IEEE International Geoscience and Remote Sensing Symposium (IGARSS), IEEE, Jun. 26, 2015. pp. 188-191 DOI: 10.1109/IGARSS.2015.7325731 EP032805987. Retrieved from the Internet on Dec. 28, 2021: https://ieeexplore.ieee.org/document/7904903. 5 Pages.

B Schweizer, C. Knill, D. Schindler, C. Waldschmidt, "Stepped-Carrier OFDM-Radar Processing Scheme to Retrieve High-Resolution Range-Velocity Profile at Low Sampling Rate" IEE Transactions on Microwave Theory and Techniques, vol. 66, No. 3, Mar. 2018. pp. 1610-1618. Retrieved from the Internet on Dec. 28, 2021: https://pparu.uni-ulm.de/xmlui/bitstream/handle/123456789/6255/SchweizerSteppedOFDM.pdf?sequence=2. 10 Pages.

* cited by examiner

OFDM RADAR SENSOR INCLUDING MULTIPLE TRANSMISSION CHANNELS AND PROGRESSIVE COMPUTATION OF TIME SIGNALS

FIELD

The present invention relates to an OFDM radar sensor including multiple transmission channels and including at least one reception channel. Moreover, the present invention relates to a method for operating such an OFDM radar sensor.

BACKGROUND INFORMATION

An orthogonal frequency division multiplex (OFDM) method is a digital modulation method using multiple carrier frequencies. OFDM methods for radar systems are gaining importance for the future. In an OFDM method, a frequency band is divided into multiple orthogonal subbands for particular subcarriers, and OFDM symbols are sequentially transmitted. The transmitted signal of an OFDM symbol is made up of mutually orthogonal subcarrier signals that are modulated according to a modulation scheme of the symbol and simultaneously transmitted within the OFDM symbol period. For this purpose, the subcarrier frequencies are selected in such a way that in the frequency spectrum, the maximum of one subcarrier is situated on a zero crossing of the other subcarrier.

For the received signal, a distance of a radar object may be estimated based on the propagation time of the OFDM symbols, while the speed may be estimated based on a phase profile, resulting from the Doppler effect, over a sequence of OFDM symbols. Multiple radar objects result in a sum of delayed and Doppler-shifted echoes of the transmitted OFDM signal. By use of a prefix in front of the symbol period, overlapping radar echoes having different propagation times may be separated from radar echoes of a subsequent OFDM symbol.

U.S. Patent Application Publication No. US 2016/0356885 A1 and German Patent Application No. DE 10 2015 210 454 A1 describe a method for operating a radar device that includes at least two transmitting antennas, in which OFDM subcarriers are divided nonoverlappingly and essentially nonequidistantly among transmission spectra, which are simultaneously transmitted by the transmitting antennas, each transmission spectrum including at least two directly adjacent OFDM subcarriers. The transmission spectra are generated by complex modulation of mutually equidistant orthogonal OFDM subcarriers. One reception spectrum is generated from a reception signal for each transmission spectrum, a division of the OFDM subcarriers being carried out corresponding to their division in the transmission spectra. The transmitted signal forms of the transmission spectra are eliminated from the reception spectra, and one radar image is generated for each reception spectrum, the radar images being evaluated in a distance dimension and in a speed dimension. In one example, 256 equidistant frequency lines corresponding to the OFDM subcarriers are pseudorandomly divided over two nonequidistant partial spectra.

"Stepped-Carrier OFDM-Radar Processing Scheme to Retrieve High-Resolution Range-Velocity Profile at Low Sampling Rate," B. Schweizer, C. Knill, D. Schindler, C. Waldschmidt, IEEE Transactions on Microwave Theory and Techniques, Vol. 66, No. 3, March 2018, pp. 1610-1618, describes a processing method for stepped OFDM radar signals. Each OFDM symbol is divided into subsymbols, which are transmitted in each case at an incrementally higher carrier frequency in order to reduce the baseband bandwidth. A phase correction of the received signals, necessary due to the stepwise transmission of the subsymbols, is integrated into a modified digital Fourier transform (DFT).

SUMMARY

An object of the present invention is to provide an OFDM radar sensor and a method for operating same, in which the memory requirements and/or computing time for generating the signals of multiple transmission channels are/is reduced, or the number of transmission channels may be increased without increasing the memory requirements by the same extent.

In a conventional OFDM radar method, the particular time signals of the individual transmission channels are generated by inverse Fourier transformation, in particular inverse fast Fourier transformation (IFFT), from the OFDM subcarriers, modulated with complex amplitudes, of a particular OFDM symbol. The memory required for the time signals thus increases with the number of transmission channels.

The object may be achieved according to an example embodiment of the present invention by an OFDM radar sensor including multiple transmission channels and at least one reception channel, including a control and evaluation device that is designed for an operating mode in which the multiple transmission channels transmit respective signals, a signal of a particular transmission channel including a sequence of OFDM symbols, and the signals of the multiple transmission channels being transmitted simultaneously, the OFDM symbols transmitted on a particular transmission channel each including OFDM subcarriers that are orthogonal to the OFDM subcarriers of the OFDM symbols that are simultaneously
  transmitted on the other of the multiple transmission channels, for a reception signal that is received from the at least one reception channel, a spectral separation of signal components of the reception signal taking place, a division of OFDM subcarriers over the signal components taking place corresponding to their division over the transmission channels in the OFDM symbols that are simultaneously transmitted on the transmission channels, and an evaluation of the signal components taking place,
  the OFDM radar sensor, at least for first transmission channels of the multiple transmission channels, for each first transmission channel including multiple buffer memories for portions of a signal form of the signal to be transmitted of the transmission channel,
  for the stated operating mode, at least for the first transmission channels, the signal form of the signal to be transmitted, which includes the sequence of OFDM symbols in question, being progressively computed in portions for each transmission channel, the multiple buffer memories being used in alternation for storing a computed portion of the signal form and for reading out a previously computed and stored preceding portion of the signal form, which is converted from digital to analog and transmitted,
  a particular portion of the signal form being computed and stored in one of the buffer memories while a preceding portion of the signal form is being read out from another of the buffer memories and converted from digital to analog, and transmitted on the transmission channel in question.

In this way, for the particular transmission channels, symbols whose subcarriers are orthogonal to those of the symbols of the other transmission channels may be used, while at least for the first transmission channels, buffer memories are required only for portions of the signal form of the entire sequence of OFDM symbols. The number of first transmission channels is at least 1 (one). The number of first transmission channels may, for example, be less than the number of transmission channels.

A signal form is understood to mean a time signal, i.e., a signal form that depicts the temporal profile of a signal or a portion thereof, for example an OFDM symbol. The progressive computation of the signal form of the signal to be transmitted is understood to mean that portions of the time signal, i.e., the signal form which depicts the temporal profile of the signal, are generated progressively in succession (piece by piece). Each portion preferably includes one or multiple of the OFDM symbols of the sequence of OFDM symbols of the signal of the transmission channel. Each buffer memory preferably has a size corresponding to a portion of, preferably a size corresponding to one or two, OFDM symbols.

Thus, for the progressive storage and readout for the digital-to-analog conversion of the portions of the signal form of the transmission signal, a particular buffer memory is repeatedly used for storing and for reading out for the digital-to-analog conversion. For example, two buffer memories may be used in alternation, or more than two buffer memories may be used in a revolving manner.

Due to the fact that the computation takes place progressively in portions, it is not necessary for the entire sequence of OFDM symbols of a first transmission channel to provide the corresponding memory for the entire signal form. The number of first transmission channels may thus be increased without the required memory thereby greatly increasing. The use of at least two buffer memories for each transmission channel makes it possible for a digital-analog converter to access a buffer memory for reading out and directly converting into an analog signal, while another buffer memory may be written into for the next portion of the signal that seamlessly follows. The multiple buffer memories may be particular memory areas of a memory.

An OFDM symbol that is included by the signal form is thus understood in particular to mean a signal form of a time period of the sequence of OFDM symbols, the signal form including a symbol spectrum of the OFDM symbol that is transformed into the time range. The symbol spectrum is defined by the occupied OFDM subcarriers and their particular complex phases. For a particular OFDM symbol, a corresponding signal section of the signal may be computed based on phase codes of the OFDM symbol, for example. In the process, a particular symbol spectrum is generated by complex modulation using complex phase codes of mutually orthogonal OFDM subcarriers. The particular symbol spectrum is transformed into the time range, for example with the aid of IFFT, thus obtaining a corresponding section of the signal form. The particular portion of the signal form thus includes one or multiple of these sections, each of which corresponds to an OFDM symbol.

The digital-to-analog conversion by a digital-analog (DA) converter may take place directly from the buffer memory to be read out. Alternatively, a DA converter may have a dedicated buffer memory that is filled from the buffer memory to be read out.

For transmitting a signal of a particular transmission channel, a high-frequency modulation of the signal that is converted from digital to analog takes place, in particular at a radar frequency of a local oscillator. The transmission of the HF-modulated signal takes place via a particular transmitting antenna of the transmission channel.

In a reception channel, a received reception signal is demodulated and digitized, i.e., converted from analog to digital. In accordance with an example embodiment of the present invention, due to the described design of the transmission signals of the particular transmission channels, in which the OFDM subcarriers of the simultaneously transmitted OFDM symbols are divided over the transmission channels, for each OFDM subcarrier frequency an association with the transmission channel in question from which it originates may take place in a received signal that is reflected from a radar object. Accordingly, a spectral separation of signal components of the reception signal takes place, a division of the OFDM subcarriers over the signal components taking place corresponding to their division over the transmission channels in the transmitted signals.

For each of the signal components, an elimination of the corresponding transmitted OFDM symbol takes place, in particular via a complex spectral division of the received signal component by the transmitted OFDM symbol. This may also be referred to as normalization of the received signal component. The channel information that is obtained by eliminating the transmitted OFDM symbols then includes information concerning the propagation time and any phase shift of the signal, and may be further evaluated to obtain distance information and speed information as well as angle information.

Preferred specific embodiments and refinements of the present invention are disclosed herein.

According to a first refinement of the present invention, for each of the multiple transmission channels, the OFDM radar sensor includes for each transmission channel multiple buffer memories for portions of a signal form of the signal to be transmitted of the transmission channel, for the stated operating mode, the signal form of the signal to be transmitted, which includes the sequence of OFDM symbols in question, is progressively computed in portions for each of the multiple transmission channels, the multiple buffer memories being used in alternation for storing a computed portion of the signal form and for reading out a previously computed and stored preceding portion of the signal form, which is converted from digital to analog and transmitted, a particular portion of the signal form being computed based on phase codes that are associated with particular OFDM subcarriers by a particular OFDM symbol of the sequence of OFDM symbols of the signal, a particular portion of the signal form being computed and stored in one of the buffer memories while a preceding portion of the signal form is being read out from another of the buffer memories and converted from digital to analog, and transmitted on the transmission channel in question.

In this way, the time signals of the transmission channels may be computed completely "live," thus minimizing the memory requirements.

According to another refinement of the present invention, for the stated operating mode, the control and evaluation device is designed to compute for the first transmission channels the particular portion of the signal form of the signal to be transmitted of the transmission channel from a corresponding portion of a signal form of a generic signal or from a corresponding portion of a signal form of a signal to be transmitted of a second transmission channel of at least one second transmission channel of the multiple transmission channels, by multiplying by a periodic oscillation at a frequency that corresponds to an n-multiple of an OFDM subcarrier distance, where n is an integer not equal to zero, and different n's are used for different first transmission channels. The (minimum) OFDM subcarrier distance is predefined by the OFDM scheme used.

The particular portions of the signal forms of the first transmission channels to be computed may thus be computed in a particularly simple and efficient manner from a corresponding portion of a signal form of a second transmission channel, or from a portion of a signal form of a generic signal, in particular from a generic signal form. Use is thus advantageously made of the fact that the phase codes of the OFDM symbols of the particular transmission channels may be freely selected. In other words, the phase codes that are modulated onto the OFDM subcarriers may be arbitrarily selected. Thus, if a portion of a signal form of a first transmission channel is computed from a corresponding portion of a signal form of a second transmission channel or of the generic signal, by a suitable selection of the frequency of the oscillation, i.e., by a suitable selection of n, by multiplying by the stated periodic oscillation it is ensured that the OFDM symbols of a first transmission channel computed in this way are orthogonal to the simultaneously transmitted OFDM symbols of the second transmission channel or to the other first transmission channels, in the sense that their particular subcarriers are orthogonal to the subcarriers of the other OFDM symbols that are simultaneously transmitted.

Carrying out a simple multiplication by the periodic oscillation represents a significant savings of computing time compared to an individual computation of a signal form by complex modulation of the OFDM subcarriers and transformation into the time range. In addition, memory is saved to a great extent due to the progressive computation in portions. Thus, for every first transmission channel, for the computation of a portion of the signal form a corresponding portion of the signal form of a second transmission channel or of the generic signal is read out from a memory, for example from a corresponding buffer memory, for the portion of the signal form of the signal of the second transmission channel; the read-out portion in the time range is multiplied by the stated periodic oscillation and stored in the corresponding buffer memory as the computed portion of the signal form of the signal of the first transmission channel in question.

The periodic oscillation that is used in the multiplication is preferably a harmonic oscillation. A harmonic oscillation is understood to mean a real, sinusoidal oscillation (encompassing a linear combination of a sine and a cosine with respective amplitudes), or a complex-valued oscillation with a sinusoidal real part and a sinusoidal imaginary part (for example, corresponding to the notation Z exp (iωt), where Z is a complex amplitude and w is the angular frequency, where ω=2πf).

According to one specific embodiment of the present invention, the OFDM radar sensor includes a memory in which at least one signal form of at least one OFDM symbol is stored, for the stated operating mode, for the at least one second transmission channel of the multiple transmission channels, the signal form of the signal of a particular second transmission channel including multiple portions, each of which includes at least one OFDM symbol, and the portions being provided and converted from digital to analog, and transmitted on the second transmission channel in question, for providing each portion of the stated portions of the signal form of the signal of the second transmission channel in question, the at least one signal form stored in the memory being accessed. The stated portions of the signal sequence are provided for the digital-to-analog conversion and the transmission.

For the first transmission channels, the particular portion of the signal form of the signal to be transmitted of the particular transmission channel is preferably computed from a corresponding portion of the signal form of a signal to be transmitted of a second transmission channel of at least one second transmission channel of the multiple transmission channels, by multiplying by a periodic oscillation at a frequency that corresponds to an n-multiple of an OFDM subcarrier distance, where n is an integer not equal to zero, and different n's are used for different first transmission channels.

Thus, memory for signal forms of the OFDM symbols used in the sequence of OFDM symbols, or for the signal form corresponding to the complete sequence of OFDM symbols, is required only for the second transmission channel(s). The required computing power may thus be minimized, it still being possible to minimize the memory requirements for the first transmission channels by computing the portions of the transmission signals of the first transmission channels from corresponding portions of the transmission signal of a second transmission channel. For example, during the digital-to-analog conversion and transmission of all portions of the signal form of the second transmission channel in question, the at least one signal form of the OFDM symbol stored in the memory is retained in memory.

For example, the signal form of the signal of the second transmission channel, including the sequence of OFDM symbols, may be completely stored in the memory. However, the signal form of the signal of the second transmission channel may also be compiled from the at least one signal form of an OFDM symbol that is stored in the memory. Thus, the memory contents do not have to be changed while providing and transmitting the signal form of the signal of the second transmission channel.

The memory may be a read-only memory, for example. Alternatively, for the stated operating mode, for example a signal form of the overall signal of a second transmission channel may be computed and stored in the memory, the signal form being computed for particular OFDM symbols based on phase codes that are associated with particular OFDM subcarriers by the particular OFDM symbol.

According to one specific embodiment of the present invention, for at least one second transmission channel of the multiple transmission channels, the OFDM radar sensor includes for each second transmission channel multiple buffer memories for portions of a signal form of the signal to be transmitted of the transmission channel, for the stated operating mode, for the at least one second transmission channel, the signal form of the signal to be transmitted, which includes the sequence of OFDM symbols in question, is progressively computed in portions for each transmission channel, the multiple buffer memories being used in alternation for storing a computed portion of the signal form and for reading out a previously computed and stored preceding portion of the signal form, which is converted from digital to analog and transmitted, a particular portion of the signal form being computed and stored in one of the buffer memories while a preceding portion of the signal form is being read out from another of the buffer memories and converted from digital to analog, and transmitted on the transmission channel in question, a particular portion of the signal form being computed based on phase codes that are associated with particular OFDM subcarriers by a particular OFDM symbol of the sequence of OFDM symbols of the signal.

For the first transmission channels, the particular portion of the signal form of the signal to be transmitted of the particular transmission channel is preferably computed from a corresponding portion of the signal form of a signal to be transmitted of a second transmission channel of at least one second transmission channel of the multiple transmission channels, by multiplying by a periodic oscillation at a frequency that corresponds to an n-multiple of an OFDM subcarrier distance, where n is an integer not equal to zero, and different n's are used for different first transmission channels.

Thus, also for the second transmission channel(s), only memory in the form of the buffer memories is required for the time signal. A corresponding portion of the signal form of the first transmission channel in question may be generated from the particular portion of the signal form of the second transmission channel by multiplying by the stated periodic oscillation.

According to one or multiple specific embodiments of the present invention, for the stated operating mode the control and evaluation device is preferably designed to determine amplitude values of the particular periodic oscillation by reading out the amplitude values from a table according to a table index, which is determined as a function of a phase angle that is incremented for temporally subsequent amplitude values of the oscillation, for oscillations having different frequencies, different phase increments being used for reading out the amplitude values from the same table. An increasing table index corresponds to an increasing phase angle.

The particular required value of the periodic oscillation may thus be easily read out from the table, so that computing time is saved. In particular, the same table may be used for the different frequencies of the periodic oscillations that are used for the particular first transmission channels. Thus, only one table for the smallest used frequency is needed.

The phase angle is thus incremented using the phase increment, and the table index is computed from the new value of the phase angle. The pattern of the phase angle is preferably periodic with a periodicity corresponding to 360°. For example, the incrementing may include a modulo operation.

The table particularly preferably includes only one-fourth of a period of a periodic oscillation, for reading out amplitude values of a second half of a first or second half period of the periodic oscillation, the table being accessed in the reverse order of the table index, and the algebraic sign of the read-out amplitude value being reversed when reading out amplitude values of a second half period of the periodic oscillation.

In this way, the scope of the table with respect to a memory of a pattern of a full period of the oscillation may be reduced to one-fourth. Amplitude values of a first half of the first half-wave of the periodic oscillation are read out directly from the table.

The multiplication is preferably computed as multiplication by a complex-value harmonic oscillation. For example, for a number of N transmission channels, if an OFDM symbol of a second transmission channel contains N−1 unoccupied subcarriers between two occupied subcarriers, an orthogonal symbol with a number of N−1 first transmission channels may be generated by simple multiplication in the time range by a complex harmonic oscillation having the frequency corresponding to the subcarrier distance multiplied by n=1, ..., N−1.

The OFDM radar sensor preferably includes a single sideband mixer for each transmission channel of the multiple transmission channels, the digital-to-analog conversion of a portion of the signal form including a digital-to-analog conversion of a real part of the portion of the signal form and a digital-to-analog conversion of an imaginary part of the portion of the signal form, and the transmission of the portion of the signal form including mixing the real part and the imaginary part of the portion of the signal form with a radar signal (a radar frequency) of a local oscillator with the aid of the single sideband mixer of the transmission channel.

Thus, by multiplying by a complex harmonic oscillation, a genuine frequency shift of the portion of the signal form in question may take place without a second sideband being generated in the HF-modulated transmission signal.

For the stated operating mode, a particular OFDM symbol of a signal of a particular transmission channel of the multiple transmission channels preferably includes unoccupied OFDM subcarriers, the occupied OFDM subcarriers in a particular OFDM symbol of a signal of a particular one of the transmission channels in the OFDM subcarrier spectrum being nested with the occupied OFDM subcarriers of the simultaneously transmitted OFDM symbols of the signals of the respective other transmission channels. The nested arrangement means in particular that the OFDM subcarriers that are occupied in a particular OFDM symbol of a signal of a particular one of the transmission channels is unoccupied in the simultaneously transmitted OFDM symbols of the signals of the respective other transmission channels.

In this way, the various transmission channels use particular overlapping overall frequency ranges, the frequencies of a particular transmission channel being present in frequency gaps of the other transmission channels. In particular, the signals of all transmission channels have comparable spectral distributions of the occupied OFDM subcarriers of the simultaneously transmitted OFDM symbols, so that the radar signal properties are very similar. At the same time, due to the stated multiplication by periodic oscillations, signals for the first transmission channels may be easily and efficiently computed from a signal of a second transmission channel.

Each OFDM symbol between neighboring groups of occupied OFDM subcarriers preferably includes a number of unoccupied OFDM subcarriers, which corresponds to the number of remaining transmission channels multiplied by the size of the groups. For example, for three transmission channels, groups of two occupied OFDM subcarriers may alternate with gaps of four unoccupied OFDM subcarriers (two remaining transmission channels times the size of two groups).

In accordance with an example embodiment of the present invention, the digital-to-analog conversion and/or the reading out of a portion of a signal form of a signal for the digital-to-analog conversion are/is preferably controlled by a clock signal which differs from a clock signal that controls the computation or provision of the particular signal form of a signal of a transmission channel via the control and evaluation device. The digital-to-analog conversion and/or the reading out of a portion of a signal form of a signal for the digital-to-analog conversion are/is particularly preferably controlled by a clock signal which differs from a clock signal that controls the computation of the particular signal form of a signal of a first transmission channel via the control and evaluation device. This means that the clock signal of the digital-analog converter differs from the clock signal that controls the operation of the control and evaluation device, in particular in computing the particular signal form of a first transmission channel. This is made possible by the buffer memories.

Moreover, the object is achieved by a method in accordance with the present invention. The method is preferably a method for operating an OFDM radar sensor as disclosed herein.

Exemplary embodiments are explained in greater detail below with reference to the figures.

BRIEF DESCRIPTION OF THE DRAWINGS

FIGS. 6.1 through 6.3 show schematic illustrations of amplitude values in a stored table, in accordance with an example embodiment of the present invention.

DETAILED DESCRIPTION OF EXAMPLE EMBODIMENTS

Figure 1:
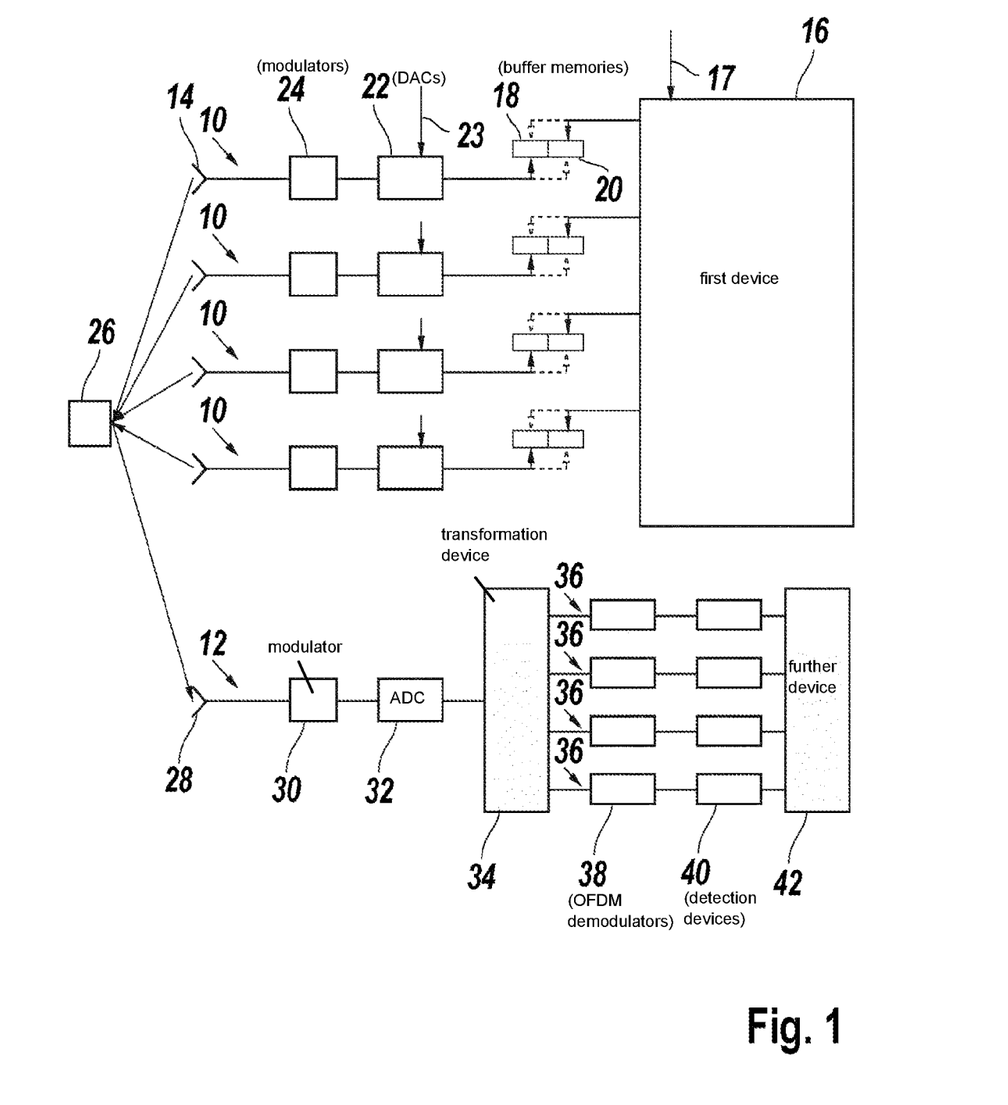
FIG. 1 shows a schematic illustration of an OFDM radar sensor, in accordance with an example embodiment of the present invention.

FIG. 1 shows a schematic wiring diagram of an OFDM radar sensor including four transmission channels 10, for example, and one reception channel 12, for example. Transmission channels 10 each include a transmitting antenna 14. A first device 16 of a control and evaluation device, which is controlled by a clock signal 17, computes respective signal forms of a transmission signal for the individual transmission channels 10. The signal forms are progressively computed in portions, for example. For each transmission channel 10, two or more buffer memories 18, 20, in which computed portions of the signal form of the transmission signal are stored in alternation by first device 16, are provided for computed portions of the signal forms.

A digital-analog converter 22 that is controlled by a clock signal 23 accesses buffer memories 18, 20 in alternation, and generates an analog signal from the read-out portion of the signal form in question. The analog signal is modulated at high frequency by a modulator 24 and emitted by transmitting antenna 14. The emitted transmission signal, which is reflected from one or multiple radar objects 26, is received by a receiving antenna 28, modulated at high frequency by a modulator 30, and digitized in reception channel 12 by an analog-digital converter 32.

The transmission signals of the individual transmission channels 10 each have signal forms that correspond to a sequence of OFDM symbols. For OFDM symbols that are simultaneously transmitted on different transmission channels 10, the occupied OFDM subcarriers of an OFDM symbol of one transmission channel are orthogonal to the OFDM subcarriers that are occupied in the simultaneously transmitted OFDM symbols of the other transmission channels.

In reception channel 12, a transformation into the frequency range takes place via a transformation device 34, for example with the aid of FFT. In the frequency range, the frequencies present in the obtained spectrum which correspond to the frequencies of the OFDM subcarriers of transmission channels 10 are divided over reception branches 36 corresponding to the association of the obtained OFDM subcarrier frequencies with the OFDM subcarriers that are occupied in the particular transmission channels 10. The signal component that is further processed in a particular reception branch 36 thus corresponds to one of associated transmission channels 10.

An OFDM demodulation of the signal component by an OFDM demodulator 38 takes place in each reception branch 36. The channel information thus obtained is further evaluated by respective detection devices 40 of the control and evaluation unit, for example by detecting speeds and/or distances of a radar object 26. A further device 42 of the control and evaluation device evaluates the object detections of individual reception branches 36 that are obtained from detection devices 40.

Figure 2:
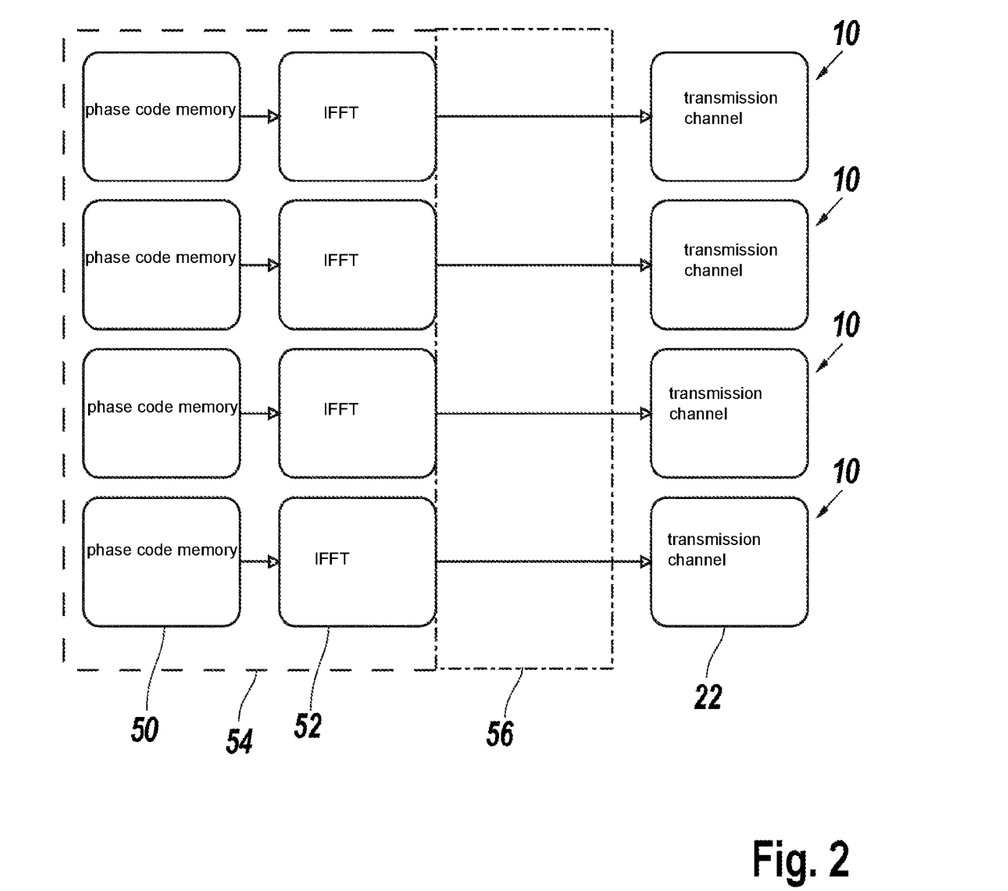
FIG. 2 shows a schematic illustration of a method for computing signal forms, in accordance with an example embodiment of the present invention.

FIG. 2 shows a first variant of a computation of the signal forms of the transmission signals of transmission channels 10, as may be carried out, for example, by first device 16 of the control and evaluation device in one specific embodiment of the present invention. In this example, first device 16 includes a phase code memory 50 for each transmission channel 10. Phase code memory 50 of a transmission channel 10 stores, for example for an OFDM symbol of a transmission channel, a phase code for each OFDM subcarrier of the OFDM symbol to be occupied. For example, a 2-bit quadrature phase shift keying (QPSK) code may be used as phase code. The number of occupied OFDM subcarriers of an OFDM symbol may be 512, for example. Phase code memory 50 thus includes 512×2 bits for each OFDM symbol of a transmission channel.

By complex modulation of OFDM subcarriers, to be occupied for the particular transmission channels, with the stored phase codes, signal forms of the OFDM symbols of the various transmission channels 10 to be simultaneously transmitted are computed in parallel for the transmission channels, for example with the aid of an IFFT 52, when carrying out a transformation of the OFDM symbols into the time range. Each signal form of an OFDM symbol represents a portion of a sequence of OFDM symbols to be transmitted on the transmission channel in question. The particular computed signal form of an OFDM symbol is stored in one of buffer memories 18, 20, for example, while a previously computed signal form of a preceding OFDM symbol is read out from the other of buffer memories 18, 20 by digital-analog converter 22 and converted. In FIG. 2, the operations carried out in frequency range 54 and the operations carried out in time range 56 are denoted by dashed-line areas 54, 56.

The illustrated computation may be implemented, for example, in a field-programmable gate array (FPGA) or an application-specific integrated circuit (ASIC). The computation is characterized by particularly low memory requirements, since the computations described here are carried out during ongoing operation, based on the stored phase codes for the OFDM symbols.

Figure 3:
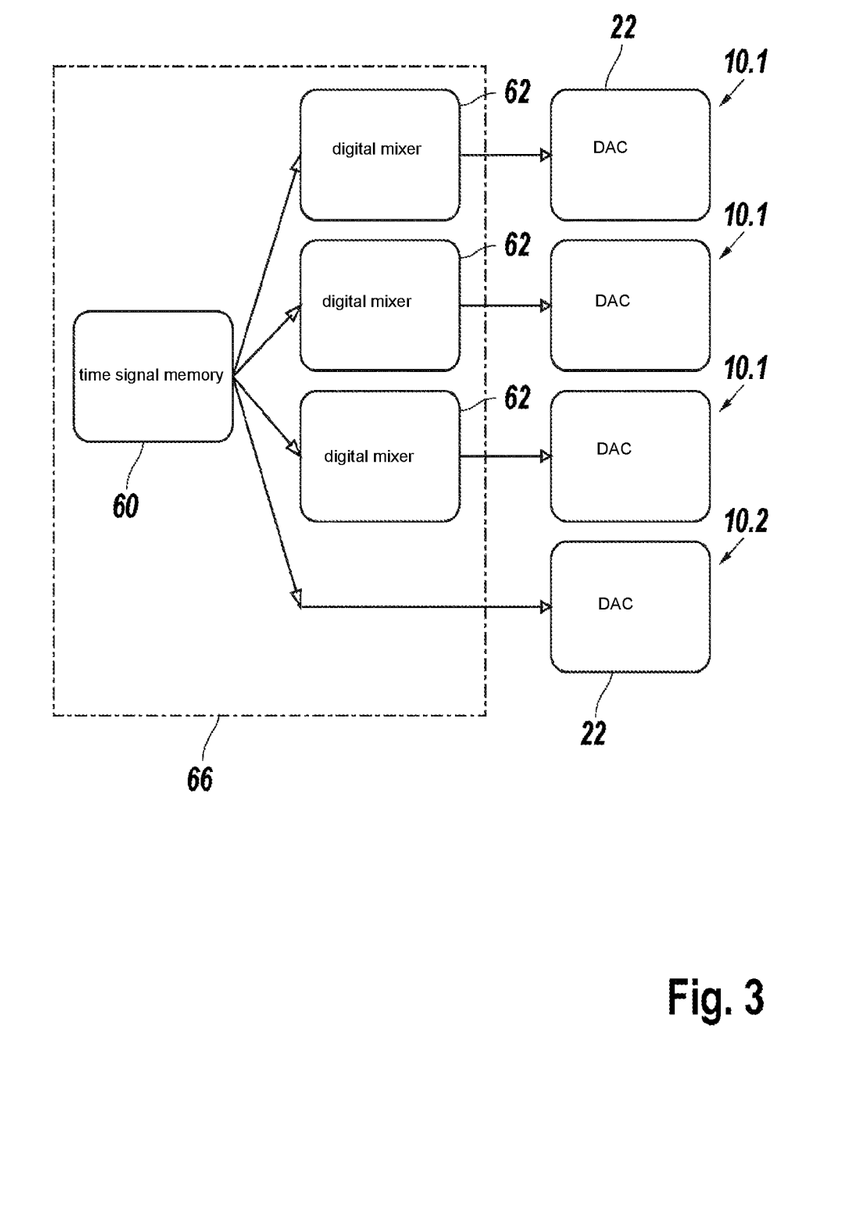
FIG. 3 shows a schematic illustration of a variant of a computation of signal forms, in accordance with an example embodiment of the present invention.

FIG. 3 shows a second variant of the computation of the signal forms of the signals to be transmitted, as may be carried out, for example, in one specific embodiment by first device 16 of the control and evaluation device. In this example, the OFDM radar sensor includes a time signal memory 60 in which a time signal (a signal form) corresponding to one or multiple OFDM symbols is stored. For an OFDM symbol, time signal memory 60 may include 2048 samples, for example, with a resolution of 16 bits, for example.

For first transmission channels 10.1, a corresponding portion of a transmission signal is generated therefrom by multiplying by the complex harmonic oscillation exp $(i2\pi n\Delta ft)$. In the simplest case, $\Delta f$ is the distance between the subcarriers of the OFDM encoding used, n is the number of the particular first transmission channel (n=1, ..., 3), and t is time. The multiplication is carried out in first transmission channels 10.1 by a digital mixer 62 in each case. By use of complex signal forms and a digital-analog converter 22 that converts the real part and the imaginary part separately (corresponding to a conversion of I/Q components), a genuine frequency shift may be achieved in a computationally simple manner.

For a second transmission channel 10.2, the time signal read out from time signal memory 60 is provided directly as a time signal, i.e., without the multiplication by a mixer 62.

This specific embodiment has the advantage that only low computing power is required. The computations, based on the signal stored in time signal memory 60, take place in time range 66, as illustrated by dashed lines in FIG. 3.

Figure 4:
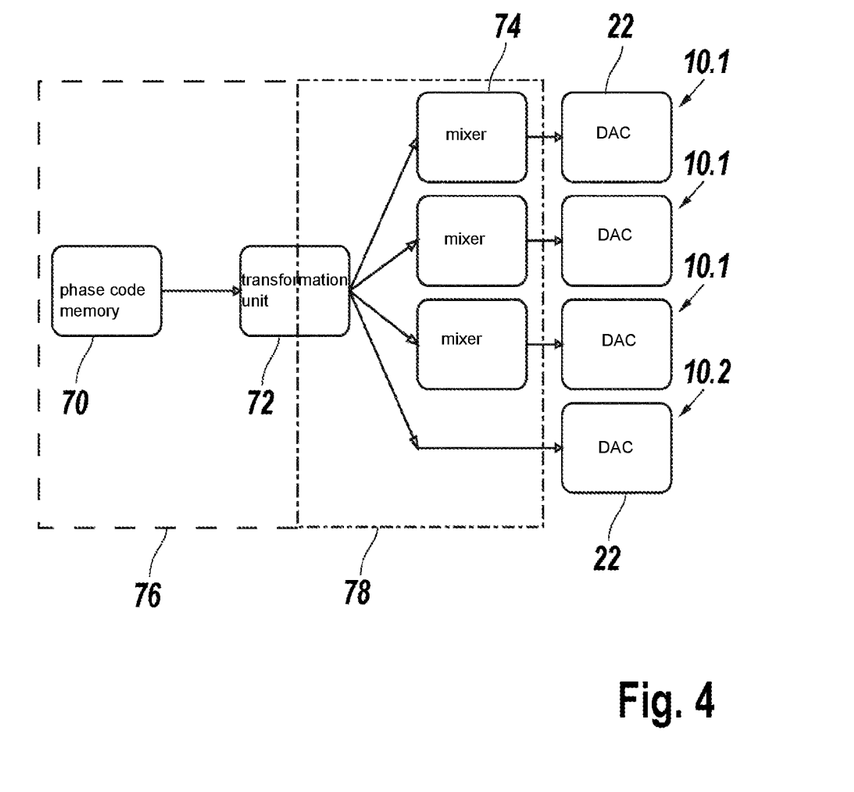
FIG. 4 shows a schematic illustration of a further variant of a computation of signal forms, in accordance with an example embodiment of the present invention.

FIG. 4 shows a third variant of the computation as may be carried out, for example, in one specific embodiment in first device 16 of the control and evaluation device. In this example, the OFDM radar sensor includes a phase code memory 70 that stores phase codes for one or multiple OFDM symbols. These may be generic OFDM symbols, or OFDM symbols for a second transmission channel 10.2. For example, corresponding to the variant in FIG. 2, a transformation unit 72 computes a time signal for a second transmission channel 10.2 from the phase codes of an OFDM symbol that are stored in phase code memory 70, by transformation of OFDM subcarriers with phase modulation according to the phase code. This corresponds to the computation of a transmission channel in the variant in FIG. 2.

For first transmission channels 10.1, a corresponding time signal is computed by multiplying by a complex harmonic oscillation corresponding to the multiplication by mixer 74 in the variant in FIG. 3. The complex harmonic oscillation having frequency $n\Delta f$ is used for nth first transmission channel 10.1. It is once again denoted in FIG. 4 which portion of the computations takes place in frequency range 76, and which portion takes place in time range 78.

In this example, the computation methods of the first and second variants are thus advantageously combined, so that a desired design of the control and evaluation unit may be optimized with regard to its computing power and the required memory.

Figure 5:
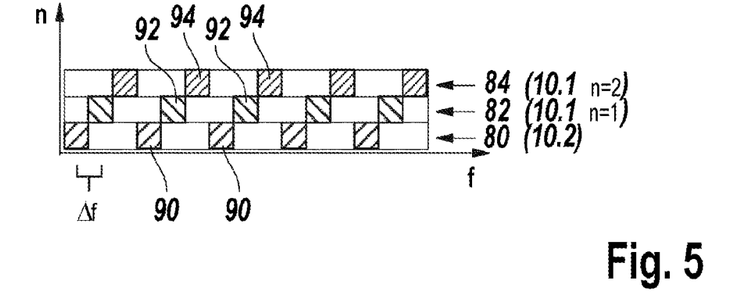
FIG. 5 shows a schematic illustration of occupied subcarriers in OFDM symbols of multiple transmission channels, in accordance with an example embodiment of the present invention.

FIG. 5 schematically shows an example of the occupation of OFDM subcarriers in simultaneously transmitted OFDM symbols 80, 82, 84 of various transmission channels 10, as may be provided for the specific embodiments described above. For simplification of the illustration, an example is provided using one second transmission channel 10.2 and two first transmission channels 10.1 (for n=1, n=2). Various OFDM symbols 80, 82, 84 of different transmission channels 10.2, 10.1 are illustrated situated one above the other in FIG. 5. Second transmission channel 10.2 includes occupied OFDM subcarriers 90 in an OFDM symbol 80, between which in each case multiple OFDM subcarriers (OFDM subcarrier frequencies) are unoccupied. First transmission channels 10.1 include occupied OFDM subcarriers 92 and 94 in their OFDM symbols 82, 84, respectively, for each transmission channel 10.1 multiple OFDM subcarriers between occupied OFDM subcarriers 92 and 94 being unoccupied in each case. Occupied OFDM subcarriers 90, 92, 94 are illustrated by filled boxes across frequency f. In the example shown, each OFDM symbol 80, 82, 84 between neighboring and occupied OFDM subcarriers includes a number of unoccupied OFDM subcarriers which corresponds to the number of the remaining transmission channels.

As explained above for the examples in FIGS. 3 and 4, by simple multiplication by a harmonic oscillation in the time range, a time signal of a respective first transmission channel 10.1 that is orthogonal to the time signal of second transmission channel 10.2 may be generated from same. In this example, the occupied OFDM subcarriers of a particular transmission channel 10.1, 10.2 in the OFDM subcarrier spectrum are thus nested with the occupied OFDM subcarriers of respective other transmission channels 10.

In practice, for example a bandwidth of 1 GHz may be utilized for 3000 OFDM subcarriers having a subcarrier distance $\Delta f$ of 333 KHz.

FIGS. 6.1-6.3 schematically shows amplitude values A of a periodic oscillation, contained in a stored table of the OFDM radar sensor, as may be used, for example, for the multiplication by a complex-value harmonic oscillation in one of the examples in FIGS. 3, 4, and 5. Amplitude values A are plotted with respect to table index I.

Figure 61:
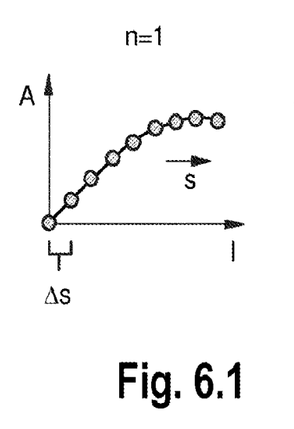
Figure 62:
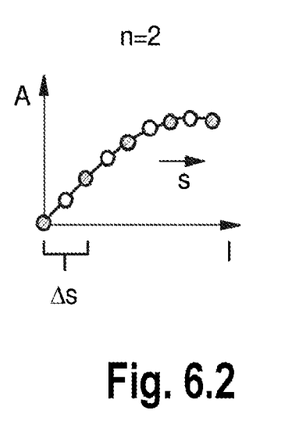
Figure 63:
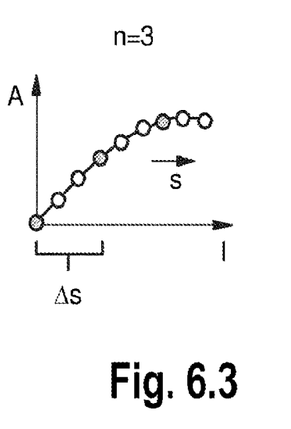

Since in the described examples, the frequency of the harmonic oscillation at which the particular multiplication for a first transmission channel 10.1 is carried out is a multiple of the smallest such frequency $\Delta f$, it is sufficient for the table to include only amplitude values of one-fourth a period of the harmonic oscillation, for example one-fourth of a real sine wave being sufficient due to the phase shift between sine and cosine.

For an element-by-element multiplication of a sample value of a time signal of a first transmission channel 10.1 by corresponding amplitude values A of an oscillation at the stated smallest frequency, as shown in FIG. 6.1, the successive amplitude values from the table are used. For higher frequencies of the harmonic oscillation that are to be used in the multiplication, at the same sampling rate, each nth value multiplication from the table is used for the element-by-element multiplication, as illustrated in FIG. 6.2 for n=2 with symbols provided for the corresponding amplitude values. FIG. 6.3 shows a similar illustration for n=3, in which only every third value from the table is used for the element-by-element multiplication.

The entire period of the harmonic oscillation may be generated by multiplying by −1 and mirroring the order of the identified values, so that the memory required for the table may be further minimized.

What is claimed is:

1. An OFDM radar sensor, comprising:
   multiple transmission channels;
   at least one reception channel;
   a control and evaluation device configured for an operating mode in which the multiple transmission channels transmit respective signals, the respective signal of each transmission channel including a sequence of OFDM symbols, and the respective signals of the multiple transmission channels being transmitted simultaneously, the OFDM symbols transmitted on each transmission channel of the multiple transmission channels each including OFDM subcarriers that are orthogonal to OFDM subcarriers of the OFDM symbols that are simultaneously transmitted on the other of the multiple transmission channels, when carrying out a transformation of the OFDM symbols into the time range;

wherein, for a reception signal that is received from the at least one reception channel, a spectral separation of signal components of the reception signal takes place, a division of OFDM subcarriers over signal components taking place corresponding to their division over the transmission channels in the OFDM symbols that are simultaneously transmitted on the transmission channels, and an evaluation of the signal components taking place, wherein, the OFDM radar sensor includes multiple respective buffer memories for each respective first transmission channel of at least first transmission channels of the multiple transmission channels, the multiple respective buffer memories being configured to store portions of a signal form of the respective signal to be transmitted of the respective first transmission channel, wherein for the operating mode, at least for the respective first transmission channels, the signal form of the respective signal to be transmitted, which includes the sequence of OFDM symbols, is progressively computed in portions for each of the respective first transmission channels, the multiple buffer memories being used in alternation for storing a computed portion of the signal form and for reading out a previously computed and stored preceding portion of the signal form, which is converted from digital to analog and transmitted, wherein a particular portion of the signal form is computed and stored in one of the buffer memories while the preceding portion of the signal form is read out from another of the buffer memories and converted from digital to analog, and transmitted on the respective first transmission channel, and wherein signal forms of the OFDM symbols of the transmission channels to be simultaneously transmitted are computed in parallel for the transmission channels, with the aid of an inverse fast Fourier transformation (IFFT) for each of the transmission channels.

2. The OFDM radar sensor as recited in claim 1, wherein:
for each respective transmission channel of the multiple transmission channels, the OFDM radar sensor includes multiple buffer memories for portions of a signal form of the respective signal to be transmitted on the respective transmission channel, for the operating mode, the signal form of the respective signal to be transmitted, which includes the sequence of OFDM symbols, is progressively computed in portions for each of the multiple transmission channels, the multiple buffer memories being used in alternation for storing a computed portion of the signal form and for reading out a previously computed and stored preceding portion of the signal form, which is converted from digital to analog and transmitted, a particular portion of the signal form is computed based on phase codes that are associated with particular OFDM subcarriers of a particular OFDM symbol of the sequence of OFDM symbols of the respective signal, the particular portion of the signal form is computed and stored in one of the buffer memories while the preceding portion of the signal form is being read out from another of the buffer memories and converted from digital to analog, and transmitted on the respective transmission channel.

3. The OFDM radar sensor as recited in claim 1, wherein for the operating mode, the control and evaluation device is configured to compute, for each of the respective first transmission channels, the particular portion of the signal form of the respective signal to be transmitted on the respective transmission channel from a corresponding portion of a signal form of a generic signal or from a corresponding portion of a signal form of a respective signal to be transmitted on a second transmission channel of at least one second transmission channel of the multiple transmission channels, by multiplying by a periodic oscillation at a frequency that corresponds to an n-multiple of an OFDM subcarrier distance, where n is an integer not equal to zero, and different n's are used for different first transmission channels.

4. The OFDM radar sensor as recited in claim 3, wherein:
the OFDM radar sensor includes a memory in which at least one signal form of at least one OFDM symbol is stored, the operating mode, the signal form of the respect signal of each of the at least one second transmission channels includes multiple portions, each of which includes at least one OFDM symbol, and the multiple portions being provided and converted from digital to analog, and transmitted on the respective second transmission channel, for providing each portion of the multiple portions of the signal form of the respective signal of the respective second transmission channel in question, the at least one signal form stored in the memory is accessed, for each of the respective first transmission channels, the particular portion of the signal form of the respective signal to be transmitted on the respective first transmission channel is computed from a corresponding portion of the signal form of a signal to be transmitted of a second transmission channel of at least one second transmission channel of the multiple transmission channels, by multiplying by a periodic oscillation at a frequency that corresponds to an n-multiple of an OFDM subcarrier distance, where n is an integer not equal to zero, and different n's are used for different first transmission channels.

5. The OFDM radar sensor as recited in claim 3, wherein:
the OFDM radar sensor includes, for each second transmission channel of at least one second transmission channel of the multiple transmission channels, multiple buffer memories for portions of a signal form of the respective signal to be transmitted on the respective second transmission channel, for the operating mode, for the at least one second transmission channel, the signal form of the respective signal to be transmitted, which includes the sequence of OFDM symbols, is progressively computed in portions for each of the at least one second transmission channel, the multiple buffer memories being used in alternation for storing a computed portion of the signal form and for reading out a previously computed and stored preceding portion of the signal form, which is converted from digital to analog and transmitted, a particular portion of the signal form is computed and stored in one of the buffer memories while a preceding portion of the signal form is being read out from another of the buffer memories and converted from digital to analog, and transmitted on the respective second transmission channel, the particular portion of the signal form is computed based on phase codes that are associated with particular OFDM subcarriers by a particular OFDM symbol of the sequence of OFDM symbols of the respective signal, and for each respective first transmission channel of the first transmission channels, the particular portion of the signal form of the respective signal to be transmitted of the respective first transmission channel being computed from a corresponding portion of the signal form of a respective signal to be transmitted of a second transmission channel of at least one second transmission channel of the multiple transmission channels, by multiplying by a periodic oscillation at a frequency that corresponds to an n-multiple of an OFDM subcarrier distance, where n is an integer not equal to zero, and different n's are used for different first transmission channels.

6. The OFDM radar sensor as recited in claim 3, wherein for the operating mode, the control and evaluation device is configured to determine amplitude values of the periodic oscillation by reading out the amplitude values from a table according to a table index, which is determined as a function of a phase angle that is incremented for temporally subsequent amplitude values of the periodic oscillation, for oscillations having different frequencies, different phase increments are used for reading out the amplitude values from the same table.

7. The OFDM radar sensor as recited in claim 6, wherein the table includes only one-fourth of a period of a periodic oscillation, for reading out amplitude values of a second half of a first or second half period of the periodic oscillation, the table being accessed in a reverse order of the table index, and an algebraic sign of the read-out amplitude value being reversed when reading out amplitude values of a second half period of the periodic oscillation.

8. The OFDM radar sensor as recited in claim 3, wherein the multiplication is computed as multiplication by a complex-value harmonic oscillation.

9. The OFDM radar sensor as recited in claim 1, wherein for the operating mode, a particular OFDM symbol of a signal of a particular transmission channel of the multiple transmission channels includes unoccupied OFDM subcarriers, occupied OFDM subcarriers in a particular OFDM symbol of a signal of a particular one of the transmission channels in the OFDM subcarrier spectrum being nested with the occupied OFDM subcarriers of the simultaneously transmitted OFDM symbols of the respective signals of the respective other transmission channels.

10. The OFDM radar sensor as recited in claim 1, wherein the digital-to-analog conversion and/or the reading out of a portion of a signal form of a signal for the digital-to-analog conversion is controlled by a clock signal which differs from a clock signal that controls a computation or provision of the signal form of the respective signal of a transmission channel via the control and evaluation device.

11. A method for operating an OFDM radar sensor including multiple transmission channels and at least one reception channel, the OFDM radar sensor includes, at least for first transmission channels of the multiple transmission channels, for each respective first transmission channel of the first transmission channels, multiple buffer memories for portions of a signal form of a respective signal to be transmitted of the respective first transmission channel, the method comprising:

transmitting respective signals on the multiple transmission channels, the respective signal of each of the transmission channels including a sequence of OFDM symbols, and the respective signals of the multiple transmission channels being simultaneously transmitted, the OFDM symbols transmitted on each respective transmission channel of the transmission channels each including OFDM subcarriers that are orthogonal to OFDM subcarriers of the OFDM symbols that are simultaneously transmitted on the others of the multiple transmission channels;

receiving a reception signal on the at least one reception channel;

spectrally separating signal components of the reception signal, a division of OFDM subcarriers over the signal components taking place corresponding to their division over the transmission channels in the OFDM symbols that are simultaneously transmitted on the transmission channels; and evaluating the signal components;

wherein, at least for each of the first transmission channels, the signal form of the respective signal to be transmitted, which includes the sequence of OFDM symbols, is progressively computed in portions for each first transmission channel, the multiple buffer memories being used in alternation for storing a computed portion of the signal form and for reading out a previously computed and stored preceding portion of the signal form, which is converted from digital to analog and transmitted, a particular portion of the signal form being computed and stored in one of the buffer memories while a preceding portion of the signal form is being read out from another of the buffer memories and converted from digital to analog, and transmitted on the respective first transmission channel, and wherein signal forms of the OFDM symbols of the transmission channels to be simultaneously transmitted are computed in parallel for the transmission channels, with the aid of an inverse fast Fourier transformation (IFFT) for each of the transmission channels.

* * * * *